A. D. PRATT.
SUPERHEATER BOILER.
APPLICATION FILED OCT. 8, 1915.

1,206,246.

Patented Nov. 28, 1916.

WITNESSES:
M. E. McNinch
P. McKergan

INVENTOR.
Arthur D. Pratt
BY Gifford Bull
his ATTORNEYS.

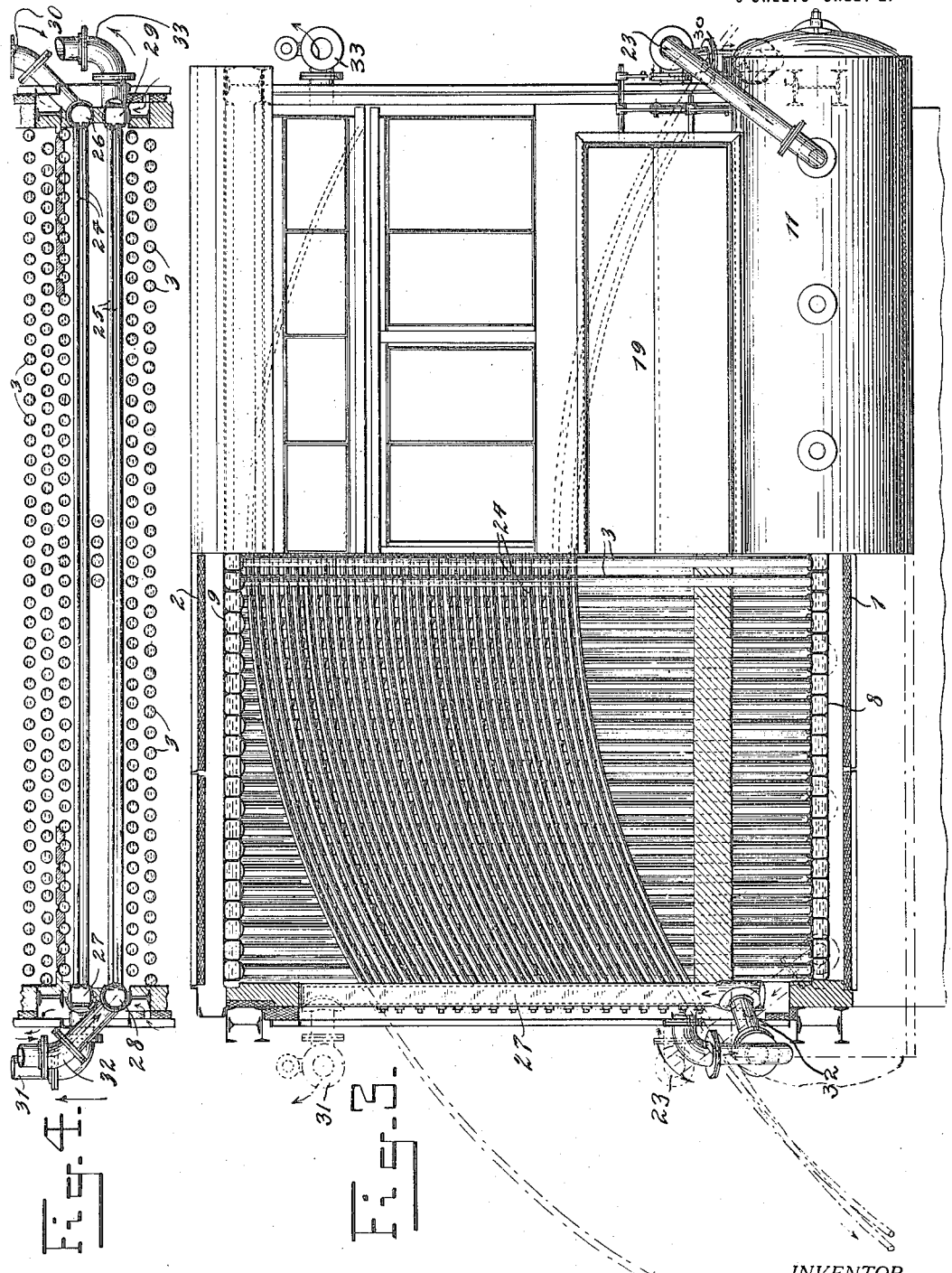

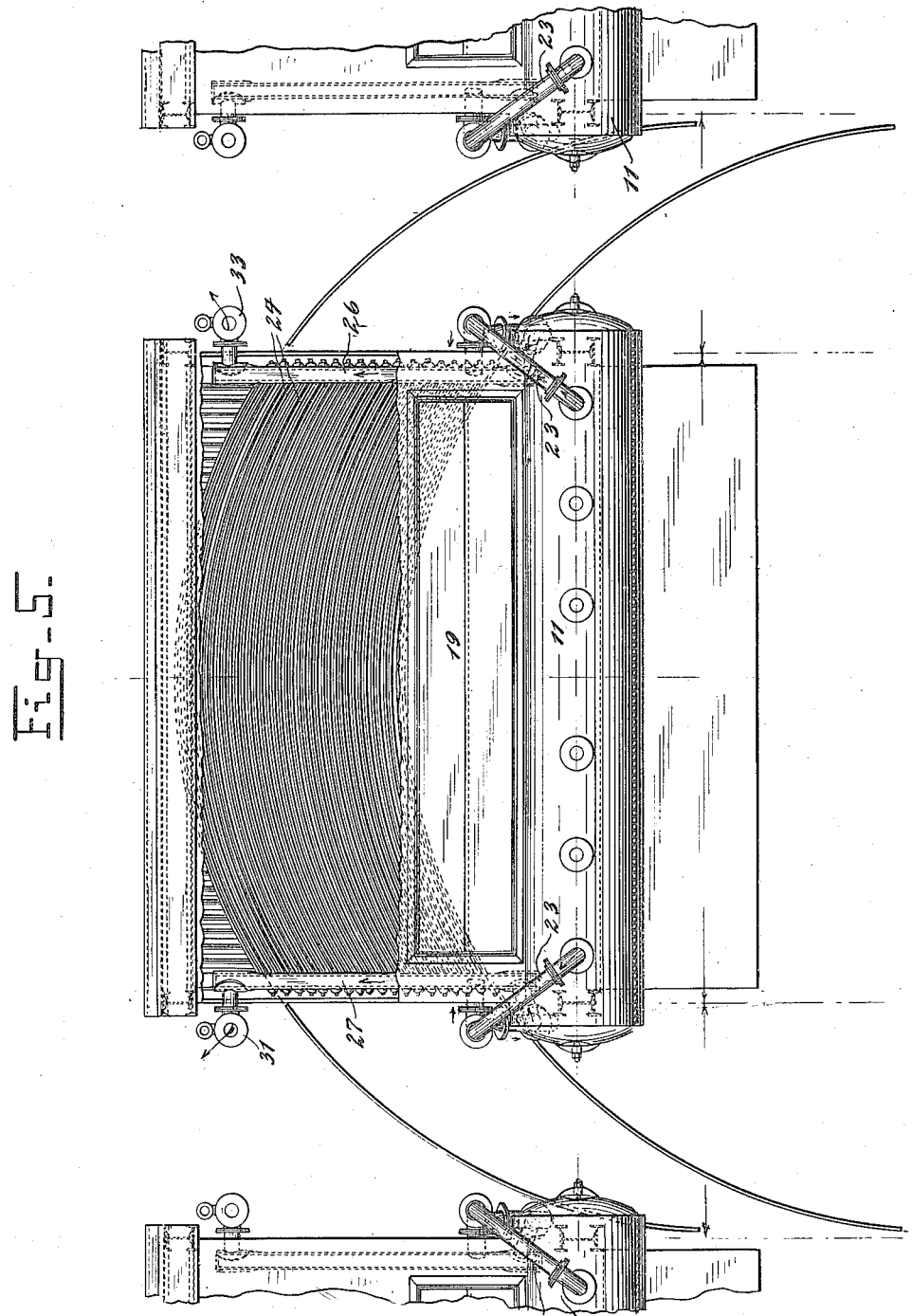

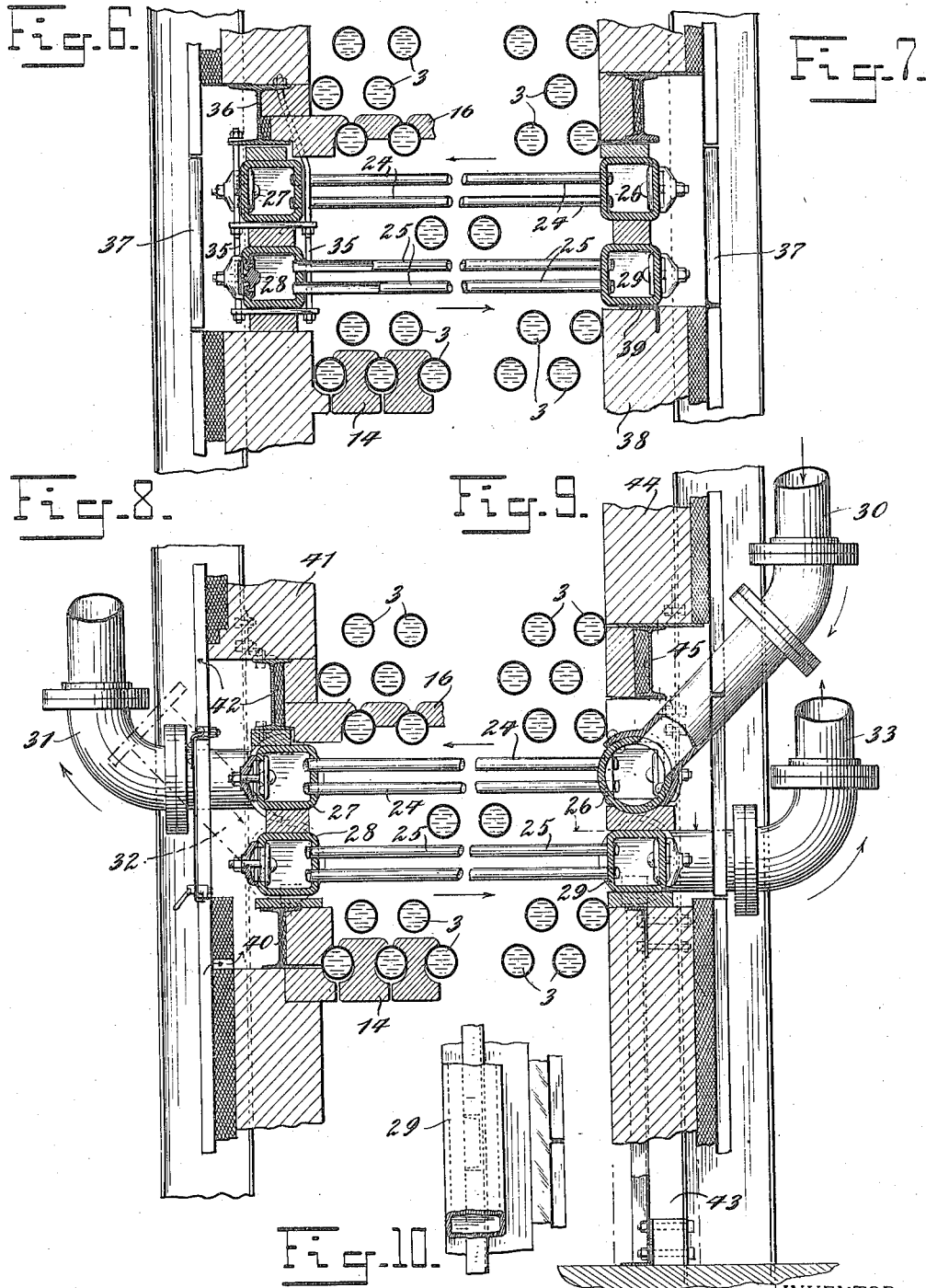

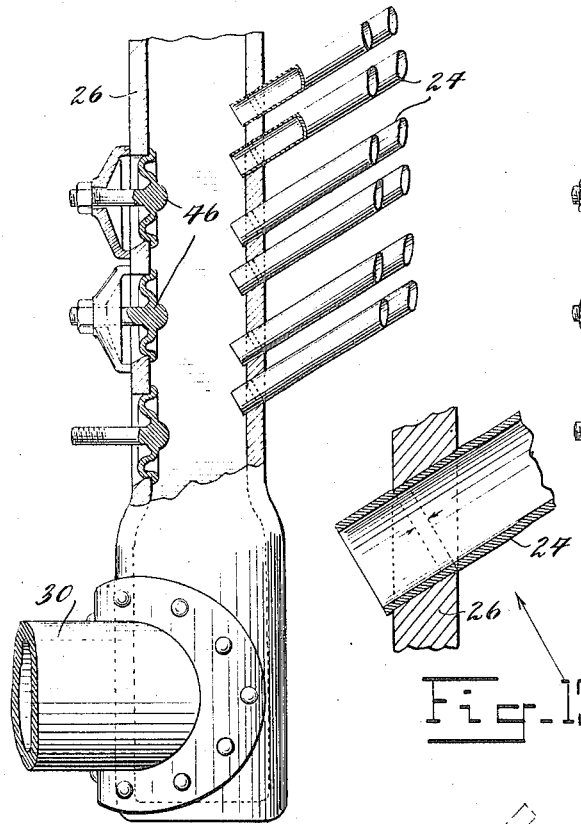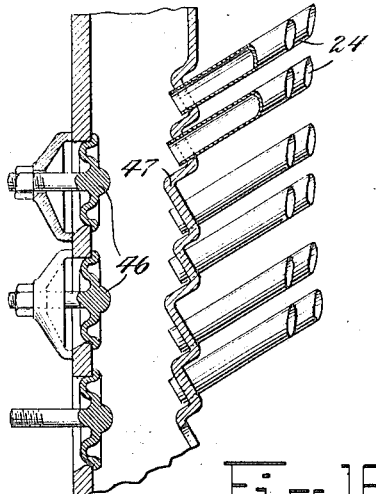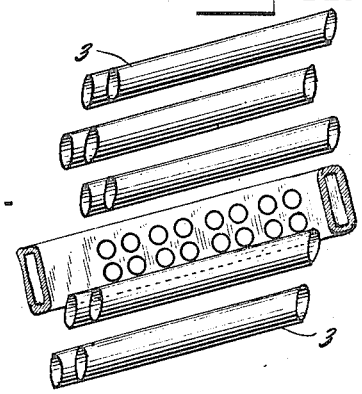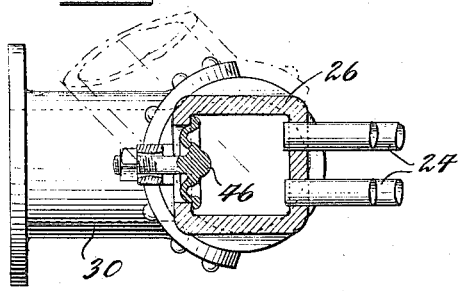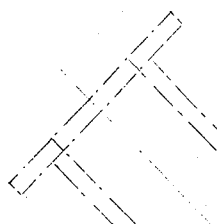

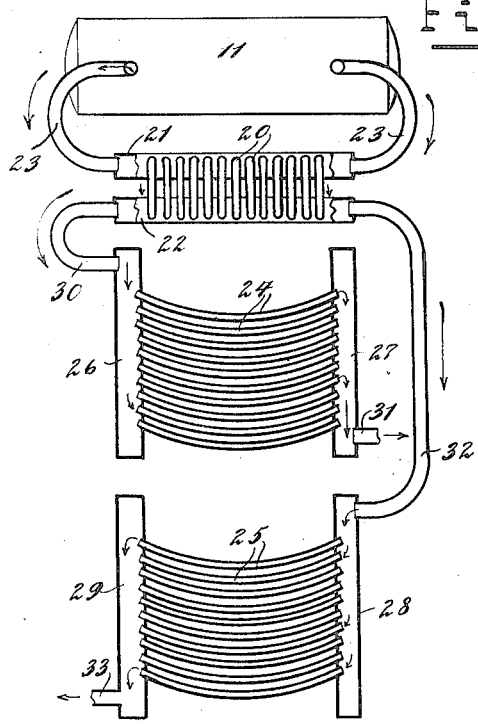
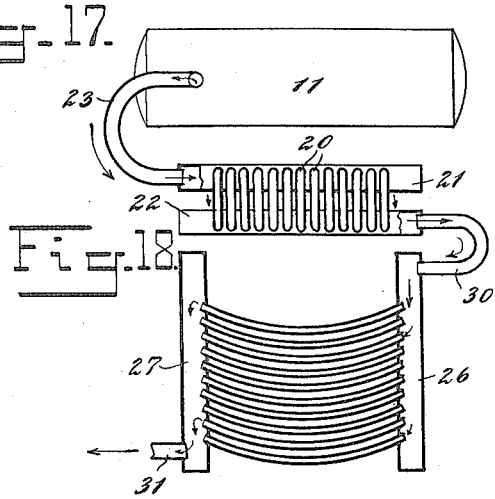
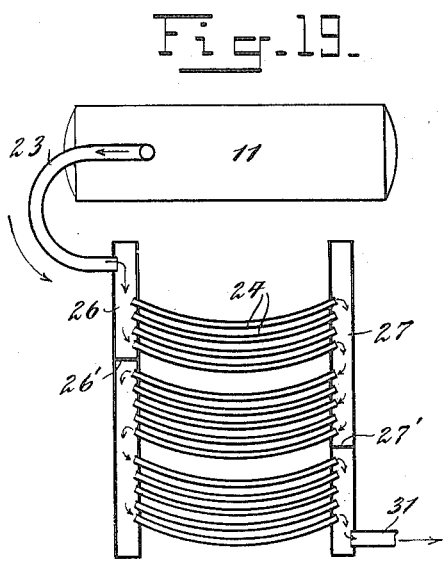
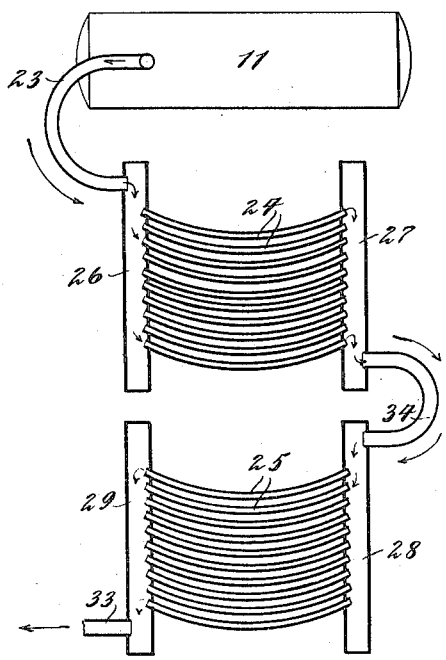

UNITED STATES PATENT OFFICE.

ARTHUR D. PRATT, OF NEW YORK, N. Y., ASSIGNOR TO THE BABCOCK & WILCOX COMPANY, OF BAYONNE, NEW JERSEY, A CORPORATION OF NEW JERSEY.

SUPERHEATER-BOILER.

1,206,246.  Specification of Letters Patent.  Patented Nov. 28, 1916.

Application filed October 8, 1915. Serial No. 54,703.

*To all whom it may concern:*

Be it known that I, ARTHUR D. PRATT, a citizen of the United States, residing at New York city, borough of Manhattan, county of New York, and State of New York, have invented certain new and useful Improvements in Superheater-Boilers, of which the following is a specification.

My invention relates to steam superheaters and will be understood by reference to the accompanying drawings in which—

Figure 1:
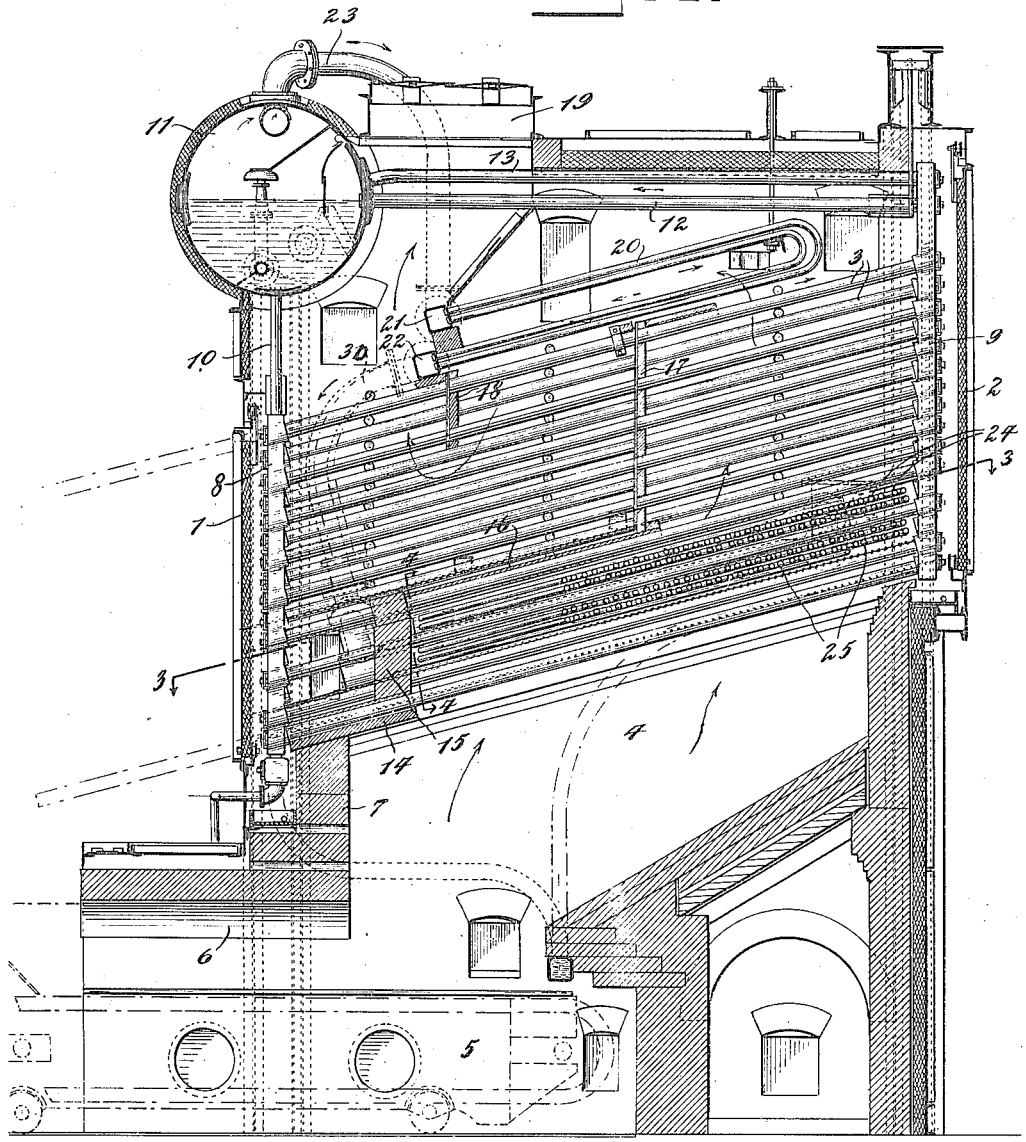
Figure 2:
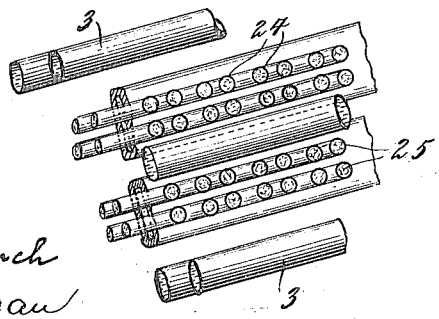

Figure 1 is a vertical longitudinal section through a boiler embodying one form of the invention; Fig. 2 an enlarged detail vertical section taken parallel with the boiler tubes showing the relative location of the superheater tubes thereto; Fig. 3 a partial plan view and partial horizontal section, the latter being on the plane of the line 3—3 of Fig. 1; Fig. 4 a transverse section on the plane of the line 4—4 of Fig. 1; Fig. 5 a partial plan view and partial horizontal section of a boiler set in a plant with additional boilers of the same type to illustrate the saving in space between the boilers by the use of curved superheater tubes; Figs. 6, 7, 8 and 9 detailed views showing different methods of supporting the headers or manifolds of the superheater in the side walls of the boiler; Fig. 10 a partial plan view of the lowermost superheater header; Figs. 11, 12, 13, 14 and 15 detailed views of one of the superheater headers, partly in section, to illustrate methods of connecting the tubes with the headers; Fig. 16 a partial detail section taken parallel with the boiler tubes to illustrate a construction in which the superheater tubes rest upon boiler tubes; and Figs. 17, 18, 19 and 20 diagrammatic views to illustrate various arrangements of the secondary superheater.

Similar reference numerals indicate similar parts in the several views.

In the drawings I have shown my invention as applied to a standard form of Babcock & Wilcox cross-drum boiler in which the numeral 1 designates the front, and 2 the rear of the setting. Within the setting is a bank of generating tubes 3 inclined upward from the front to the rear over the combustion chamber 4. The boiler is shown as fired with a chain grate stoker 5 over which is the usual ignition arch 6, and a cross-wall 7. The generating tubes are expanded into front and rear headers 8 and 9 respectively. The front headers are connected by pipes 10 with a cross-drum 11, and the rear headers are connected to said drum by water and steam circulators 12 and 13 respectively. A short roof baffle 14 is supported upon the cross-wall 7 and the lower end of the lowermost row of tubes, and upon said roof baffle is supported a cross-wall 15 extending upward, in the particular boiler selected for illustration, the height of six rows of tubes. A longitudinal baffle 16 extends from the rear portion of cross-wall 15 and is supported upon one of the rows of tubes. A vertical baffle 17 rises from the rear portion of baffle 16 to the uppermost row of tubes. The baffling described, with a short transverse baffle 18, and its upward extension 18', causes the gases to flow along the tubes below the baffle 16 and to cross the bank at the uptake end of the tubes, and thence flow downward and upward as indicated by the arrows, to the uptake 19. Located in the triangular space below the horizontal circulating pipes and above the inclined tubes, is a standard form of U-tube superheater 20 to which I shall refer as the primary superheater. The headers or manifolds 21 and 22, of the primary superheater, are built into, or supported upon, the brickwork above baffle 18, bringing the hand-hole fittings above the third pass of the boiler where they are exposed only to moderate temperatures. Steam from drum 11 flows through the main 23 into the intake header 21, passes through the superheater tubes and is taken from the outlet header 22. The parts so far described are of standard form and design.

In order to meet present day requirements for superheated steam I have designed a new form of superheater and have located it within the bank of generating tubes where it will be subjected to a relatively high degree of heat. The new form of superheater may comprise one or more sets of tubes receiving steam directly from the boiler drum, or if a standard superheater is also installed, the steam therefrom may be delivered to one or more sets of tubes which comprise the secondary superheater. These various arrangements I have illustrated diagrammatically in Figs. 17 to 20.

In the form and arrangement illustrated in Figs. 1 to 4 (shown diagrammatically in Fig. 17) the secondary superheater comprises two sections, and is connected to the standard superheater 20. The latter, as before stated, will be referred to as the primary superheater. One section of the secondary superheater consists of a set of tubes 24 and the other of a set of tubes 25, the tubes of both sections being bent or bowed more or less either on tangents, or so that their center lines approach the arc of a circle. The tubes 24 are expanded into headers 26 and 27, and the tubes 25 are expanded into headers 28 and 29. These headers are at the sides of the boiler and are set parallel with the boiler tubes. The secondary superheater, when comprising one or more sections, may be placed in any position in the boiler between the water tubes. Where a comparatively low degree of superheat is desired it will be placed more remote from the furnace than shown in the drawings. For a high degree of superheat I prefer to place the superheater substantially as shown in Fig. 1, that is, one section between the second and third rows of tubes, and the other between the third and fourth rows of tubes from the bottom of the bank. The tubes of the superheater sections thus occupy the spaces which would ordinarily be occupied by boiler tubes, the two lowermost rows of boiler tubes protecting the superheater from the direct radiant heat of the furnace. Owing to the smaller size of the superheater tubes, two rows can be put in place of a removed row of water tubes. In such location a relatively small amount of heating surface is passed over before the gases reach the superheater—in the boiler shown, about 14%—whereas, with the superheater located in the triangular space above the tubes about 45% of the heating surface is passed over before the gases reach the superheater. Under the high temperature to which the tubes of the secondary superheaters are subjected the tubes are liable to spring or to become distorted, and one of the advantages of my improvement is that the amount of springing or distortion in a vertical direction is limited by the boiler tubes 3 which are above and below the superheater tubes as shown in Fig. 2. A further advantage lies in the fact that the bending of the superheater tubes enables them to expand and contract within their length by bowing more or less without pushing on the headers as they would if the tubes were straight. Instead of the relation of the superheater tubes to the boiler tubes, as shown in Fig. 2, the former may be made to rest directly upon the boiler tubes, as shown in Fig. 16.

When arranged as shown in Figs. 1 to 4, and Fig. 17, the saturated steam passes from the drum 11 through the two mains 23 to the inlet header 21 of the primary superheater, flows through the loop tubes to the outlet header 22, and thence through two connecting pipes to the two sections of the secondary superheater. One of these connections 30 leads to the lower end of the header 26 of the upper section of the secondary superheater, the steam flowing through the tubes 24 to the header 27, and from thence through the outlet connection 31, leading from the upper end of header 27. The other connection 32 from header 22, leads to the lower end of the inlet header 28 of the other section of the secondary superheater, the steam flowing therefrom through the tubes 25 to the outlet header 29, and thence through the outlet connection 33 from the upper end of the header. As shown in Figs. 3 and 4, the headers are supported in the side walls of the setting so that there is a parallel flow of the steam from one superheater header to the other, that is, the steam is divided between all of the superheater tubes, and flows in opposite direction through the tubes of the two sections from one header to the other of the section. Instead of the arrangement above described, the secondary superheater may consist of a single set of tubes, as shown diagrammatically in Fig. 18, the steam flowing through the two superheaters as indicated by the arrows.

In some instances it may be desirable to dispense with the primary superheater, in which case, the steam may be led directly from the drum 11 through main 23 to the lower end of the header 26, and thence through the tubes 24 to the outlet header 27, as indicated in Fig. 19. I have also indicated in Fig. 19 partition walls 26' and 27' in the headers 26 and 27 to cause a back and forth flow of the steam through the superheater. In Fig. 20 I have shown another arrangement which omits the standard or primary superheater and in which the two sections of the secondary superheater are connected in series by a pipe 34. In this arrangement all of the steam flows from the boiler through the first section and then through the second section of the secondary superheater.

In Figs. 6, 7, 8 and 9 I have shown several methods for supporting the superheater headers in the side walls of the setting. Thus in Fig. 6 the headers are suspended by means of bolts 35 from I-beam 36 above the headers. This I-beam also supports the brickwork of the boiler side wall above the headers. Access to the hand-hole fittings and headers may be had through a removable steel panel 37. In Fig. 7 the headers are shown as supported directly upon the brickwork 38. A bearing piece 39 formed of an angle iron is embedded in the brickwork. Fig. 8 illustrates another construction in which the headers are supported upon an I-beam 40 below the lower headers. The brickwork 41 above the headers is supported upon I-beam 42. The flanged fitting 31, for discharging the steam from the upper header 27 is also shown. The inclined connection 32, shown in dotted lines, is the inlet to the header 28 of the lower secondary superheater arranged so that it will not interfere with the withdrawal of the superheater tubes. Fig. 9 illustrates a fourth possible method of supporting the superheater headers by short vertical columns 43 which run directly from the lowermost header to the floor. In this construction the brickwork 44 above the headers is supported on a longitudinal I-beam 45, the ends of which will be connected to the boiler supporting columns. The steam inlet connection 30 and the outlet connection 33 are so arranged that they will not interfere with the removal or replacing of the superheater tubes.

In Fig. 11 I have shown a detail of one of the superheater headers, partly in section, with the curved tubes on one side and hand-hole fittings 46 on the other side through which the tubes may be inserted or withdrawn. The steam inlet connection 30 is shown as riveted to the side of the header near its end, the head being circular at that point. An end view of one of the headers, partly in section is shown in Fig. 12. The method of rolling the superheater tubes in the headers, if of the form shown in Fig. 11, is shown in Fig. 13. It will be noticed that the thickness of the header is such as to give a sufficient length of seat for the tube in a plane perpendicular to the axis of the tube.

In Figs. 14 and 15 is shown an arrangement of superheater headers with a stepped tube sheet 47 so that the ends enter the holes in the headers in a normal or right angle direction. This allows the tubes to be expanded in the ordinary way. As also shown in Figs. 14 and 15 the side of the header having the hand-holes may be made thicker than the side through which the tubes enter, or thicker than the other sides. This construction applies to a boiler header as well as to a superheater header, and is advantageous in some constructions where high pressures are to be carried.

An advantage of using tubes bent so that their center lines approach the arc of a circle is that they can be withdrawn from the sides of the superheater in locations where there is a comparatively narrow passage between the boilers. This possibility is illustrated in Fig. 5. In a boiler for which I designed the present superheater the boiler furnace was about twenty-four feet wide, and the tubes about twenty-six feet long. If straight tubes had been used it would have been necessary, for the removal of the tubes, to make the passages between the boilers practically as wide as the length of the tubes. This would make any such superheater impracticable in the modern boiler room equipped with large size units. The superheater tubes, being on the arc of a circle, can be withdrawn into a passage of slightly less than ten feet.

It will be noted that the superheater tubes may be drawn out and replaced through the superheater headers, this being a highly desirable feature. It will also be noted that the superheater tubes are exposed to the action of the hot gases throughout their entire length from face to face of the superheater boxes, while at the same time the tubes may be readily removed and replaced; also that the superheater headers or boxes or portions of them form part of the superheating surface.

A primary superheater is preferably used in connection with this special superheater, though this may or may not be used, within the scope of the broader claims.

Various changes and modifications may be made as suggested in the foregoing description, thus while I have shown the secondary superheater, in Figs. 1 to 4, made up of two sections only, a single section may be used as shown in Figs. 18 and 19. Also the arrangement of superheater tubes may vary, that is, instead of four tubes per cluster, handled through a single hand-hole, there may be one, two or three or more than four. Also the tubes may be arranged in a single row or any more than the two rows shown in the drawings.

What I claim and desire to secure by Letters Patent of the United States, is:—

1. A water tube boiler having longitudinal water tubes, a superheater having transversely extending bent tubes between the water tubes, and baffling for directing the products of combustion, at least a part of this baffling extending transversely of the water tubes.

2. A water tube boiler having front and rear headers connected by inclined water tubes, a primary superheater above the bank of water tubes, a secondary superheater extending transversely of and between rows of water tubes, and pipe connections between the steam drum and the primary superheater and between the latter and the secondary superheater.

3. A water tube boiler having front and rear headers connected by inclined water tubes, a primary superheater above the bank of water tubes, a secondary superheater having curved tubes extending transversely of and between rows of water tubes, and pipe connections between the steam drum and primary superheater and between the latter and the secondary superheater.

4. A water tube boiler having front and rear headers connected by inclined water tubes, a primary superheater above the bank of water tubes, and a secondary superheater having curved tubes extending transversely of and between rows of water tubes, said secondary superheater comprising a plurality of sections, and pipe connections between the steam drum and primary superheater and independent connections between the latter and each section of the secondary superheater.

5. A water tube boiler having front and rear headers connected by inclined water tubes, a superheater comprising boxes located in the side walls, and having at least their inner portions exposed to the gases, said boxes being connected by bent tubes extending between rows of water tubes, the superheater tubes being removable and replaceable through the boxes.

In testimony whereof I have hereunto signed my name in the presence of two subscribing witnesses.

ARTHUR D. PRATT.

Witnesses:
EUGENE P. TERRY,
JOHN A. W. DIXON.